United States Patent
Totten et al.

[11] 3,888,035
[45] June 10, 1975

[54] ICE FISHING ROD

[76] Inventors: Ralph P. Totten, 7455 Parkstone Ln., Birmingham, Mich. 48010; Gerald F. Lewis, 1850 Columbia, Berkley, Mich. 48072

[22] Filed: Mar. 18, 1974

[21] Appl. No.: 451,948

[52] U.S. Cl. .............................. 43/17; 43/20; 43/23
[51] Int. Cl. ................................................ A01k 97/12
[58] Field of Search ............ 43/17, 16, 23, 18, 21.2, 43/15, 20, 22

[56] References Cited
UNITED STATES PATENTS

| | | | |
|---|---|---|---|
| 2,598,778 | 6/1952 | Fred | 43/17 |
| 2,977,704 | 4/1961 | Tinsley | 43/17 |

*Primary Examiner*—Warner H. Camp
*Attorney, Agent, or Firm*—Krass & Young

[57] ABSTRACT

An ice fishing rod has an elongated support member pivotably connected at its midpoint to the end of the rod handle so that it may be positioned coaxially with the handle, to form an extension of it, for hand held fishing, or normally to the handle to act as a crossbar which may be placed over the top of an ice hole so that the main body of the rod projects downwardly through the hole. A resilient ring surrounding the handle may be moved over the support section to retain it in its coaxial position or may be moved downwardly to bear against and adjustably brake a reel rotatably supported in the handle. The reel handle is adjustably supported with respect to the reel axle so that it may be moved between an extending position in which the reel may be manually controlled and a retracted position wherein it reduces the size of the ice hole which must be formed to allow the reel to be disposed in the water. A flexible tip-up flag has one end of its mast supported by the end of the rod and its free end is adapted to be retained in a slide supported for longitudinal movement within the rod handle. The other end of the slide bears against a cam formed on the reel axle so a small rotation of the reel caused by a fish pulling on the line will cause the cam to move the slide, freeing the tip-up and allowing it to spring into an upright position to alert the fisherman.

8 Claims, 7 Drawing Figures

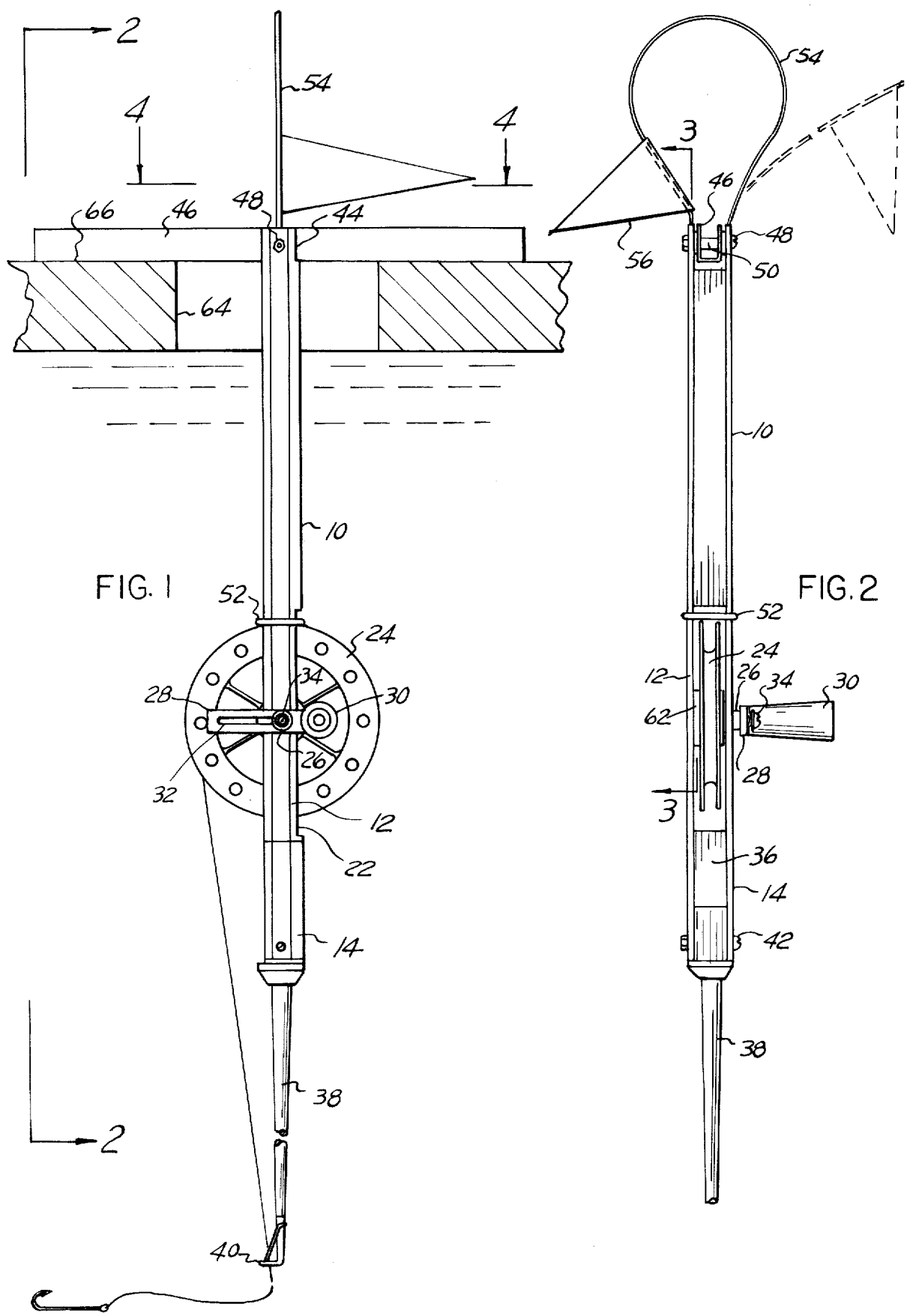

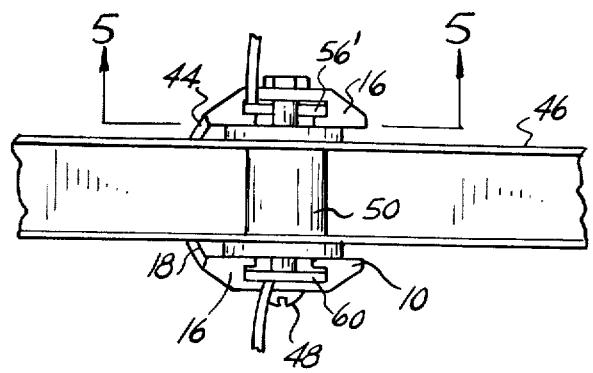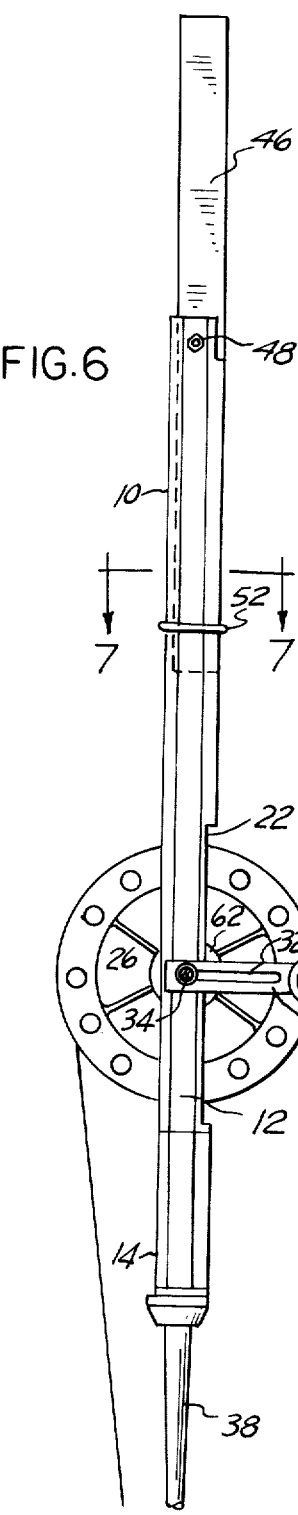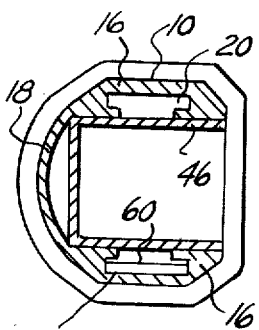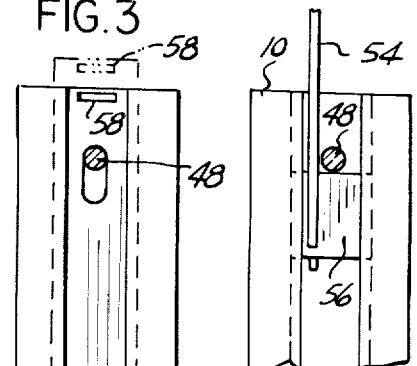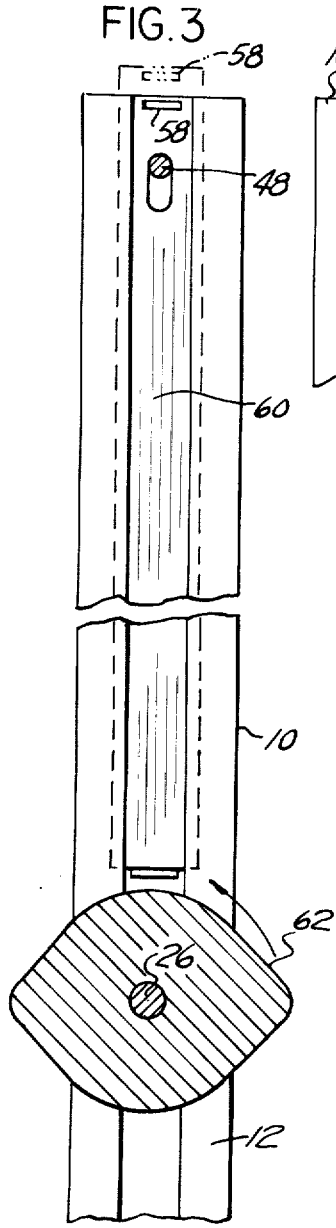

ICE FISHING ROD

FIELD OF THE INVENTION

This invention relates to an ice fishing rod having an integral tip-up flag adapted to be actuated by movement of the reel and having a support member for retaining the rod in an ice hole which may be moved into a position wherein it forms an extension of the rod for hand held fishing.

BACKGROUND OF THE INVENTION

While a regular hand held fishing rod may be used to fish through a hole in ice formed over a body of water a variety of special devices have been developed which overlie an ice hole and support a rod so the fisherman may tend a number of lines or be engaged in other activities. Such a support must include means for alerting the fisherman that a fish is biting; a condition that a fisherman hand holding a rod detects by the pull on the rod. A variety of alarms known as "tip-ups" have been devised to signal the fisherman of a pull on the fishing line. These usually include a resilient wire or mast carrying a flag and having one end fixed to the support. The other end is bent downwardly and retained by a trigger mechanism connected to the fishing line which acts to release the retained mast end in response to the force of a tug on the line so the flag springs upwardly to alert the fisherman.

SUMMARY OF THE PRESENT INVENTION

The present invention is directed to a rod having a built-in support which may be positioned either so as to retain the rod in a secure manner in a fishing hole or so that it forms an extension of the rod handle and allows the rod to be used for normal hand fishing. The rod includes a built-in tip-up which is triggered into a release position in response to rotation of the reel as a result of a pull on the line.

In a preferred embodiment of the invention, which will be subsequently described in detail, the rod has a line guide section at one end and a handle at the other end and supports a reel between the two. An elongated support member has its midpoint pivotably connected to the end of the rod handle. The rod handle has a U-shaped cross section and when the support rod is positioned so it is coaxial with the handle, half of the support projects axially as an extension of the handle, allowing the rod to be hand held in the manner of a normal fishing rod. The support may be pivoted so that it extends normally to the rod and the support and the handle assume a T configuration. In this position the rod proper may be extended through a hole in the ice and the support section lies across the top of the hole and retains the rod.

The handle section of the rod has a sufficient length between its connection to the support and the reel so that when the rod is retained in an ice hole by the support section the reel extends below the bottom of the thickest ice likely to be encountered. This eliminates the possibility of the reel hitting the sides of the ice hole and causing the reel to lock against rotation under the influence of lateral forces such as current or a fish pulling on the line.

In a preferred embodiment of the invention a cutaway is formed in the web of the channel section of the handle to create a pair of spaced bars which journal the reel axle so that the reel is supported between the two sections and lies in the plane of the rod. A resilient ring supported on the handle may be moved downwardly against the edges of the reel to act as a brake for the reel or may be moved outwardly toward the handle end to retain the support section in coaxial alignment with the handle, within the handle channel.

A cam is formed on the reel axle and an elongated slide member is retained within a longitudinally formed slideway in the handle channel so that one end of the slide may bear against the cam. The other end of the slide extends just beyond the free end of the handle and has a slot adapted to retain the free end of a resilient tip-up mast which has its other end fixed to the channel handle so that the mast is bent into a U-shaped form. When a fish bites, the pull on the line rotates the reel so that the slide member is moved by the cam freeing the tip-up mast and allowing it to spring upright to alert the fisherman.

The reel handle is fixed on one end of a crank member adjustably retained to the reel axle so that its extension may be adjusted between a full projection wherein it may be used in a normal manner, and a retracted position which minimizes the cross section of the reel to minimize the size of hole which must be formed in the ice to allow the rod to project through it.

Ice fishing rods formed in accordance with the present invention are therefore simple in construction so as to be low in cost and reliable in operation, yet provide all of the advantages of the hand held rods or ice supported rods previously employed for ice fishing.

Other objectives, advantages, and applications of the present invention will be made apparent by the following detailed description of a preferred embodiment of the invention, wherein;

FIG. 1 is an elevation view of a preferred embodiment of an ice fishing rod formed in accordance with the present invention with the ice support extending laterally from the end of the rod handle to support the rod below a hole in the ice, with the tip-up in ready position;

FIG. 2 is a side view of the rod of FIG. 1 taken in the direction of lines 2—2 of FIG. 1 and showing the alert position of the tip-up in phantom;

FIG. 3 is an elevation sectional view through the handle of the rod, taken along line 3—3 of FIG. 2 and illustrating the cam and tip-up relief;

FIG. 4 is a top view of the rod in the position of FIG. 1, taken in the direction of lines 4—4 of FIG. 1;

FIG. 5 is a detailed sectional view of the mechanism for retaining the tip-up relative to the rod handle taken along lines 5—5 of FIG. 4;

FIG. 6 is a view of the rod as it is used for hand held fishing with the support extending coaxially through the handle; and FIG. 7 is a sectional view through the handle of the rod in the position of FIG. 6, taken along line 7—7 of FIG. 6.

Referring to the drawings the preferred embodiment of the ice fishing rod is formed of an elongated aluminum extrusion having a generally U-shaped configuration and includes a handle section 10, a reel retaining section 12 and a line guide support section 14. The shape of the basic extrusion is best seen in FIG. 7. It includes a pair of flanges 16 which extend parallel to one another and are joined in spaced relation by a curved web 18. Each of the flanges 16 has a rectangle slideway 20 formed in its midsection and connecting to its interior side.

The web 18 is cutaway as at 22 along the reel retaining section 12 of the rod and a reel 24, preferably formed of ejection molded plastic, is journaled between the split flanges 16 on a keyed axle 26 having its ends journaled in holes formed in the flanges 16 in the center of the cutaway section 22.

An elongated reel crank 28 has a rotatable knob 30 fixed to one of its ends. An elongated slot 32 is formed in the crank and the crank is fixed to the reel axle 26 by means of a screw 34 which passes through the slot in the crank and threads within a hole formed at the end of the reel axle. A spring washer is disposed between the crank and the head of the screw 34 and allows the extension of the crank from the reel axis to be adjusted. In FIG. 6 the handle is shown in a fully extended position. In FIG. 1 the handle is shown in its retracted position. Adjusting the handle to its retracted position allows the reel to be passed through a smaller hole in the ice than would otherwise be required. Adjusting the handle extension also varies the moment of inertia of the reel so that when a very freely rotating reel is desired the handle may be adjusted inwardly.

The line guide section 14 of the rod retains a plastic or wooden stock member 36 formed integrally with a fiberglass tip 38 which extends coaxially from the far end of section 14. One or more line guide members 40 may be attached to the fiberglass tip 38. A nut and bolt 42 releasably retain the stock 36 within the line guide at end 14 of the rod.

Turning to the other end of the rod, the web 18 is cut away as at 44 for a short distance at the extreme end of the handle section 10 so that the flanges 16 may straddle an elongated channel section support member 46. The support member 46 may comprise a section of extruded aluminum having a dimension between the outer surfaces of its flanges which allows it to fit within flanges 16 of the handle section.

A nut and bolt assembly 48 passes through holes formed in opposed sections of two of flanges 16 of the handle member adjacent to the cutout area 44 and through a pair of holes formed at opposed points in the flanges of the support section 46, midway along its length so as to pivotably retain the support section 46 in the end of the handle 10. A bushing 50 surrounds the nut and bolt assembly 48 between the flanges of the support member 46. The support section 46 may be moved between a position wherein half of its length is retained within the channel of the handle section 10 and its other half extends coaxially beyond the handle as illustrated in FIG. 6, so as to form an extension of the handle, and a position wherein the support 46 extends normally to the handle end as shown in FIG. 1.

A resilient ring 52 surrounds the handle section 10. It may be moved over a contained support section 46, in the manner illustrated in FIG. 6, in order to retain the support section in its coaxial position.

A resilient wire tip-up mast 54 has one of its ends fixed within the handle section 10 adjacent to the end of the handle by attachment to a plate 56 which is wedged within the slideway 20 formed in one of the handle channels. The mast 54 normally projects outwardly from the handle in the manner illustrated in phantom in FIG. 2 and has a triangular flag 56 fixed adjacent to its outer end. The far end of the mast 54 is formed with a hook and the hook may be engaged in a slot 58 formed in the end of an elongated slide member 60 to retain the mast in the bent shape illustrated in FIGS. 1 and 2.

The slide 60 makes a loose fit within its guideway 20 and when the rod is in a vertical position with the handle end 10 upward the lower end of the slide 60 bears against a two lobed cam 62 which is afixed to and rotates with the reel axle 26, as is best seen in FIG. 3. When the reel is oriented so that the slide 60 bears against the low point on the cam 62 the slot 58 is just below the end of the reel handle and the hook end of the mast 54 may be locked between the slot 58 and the edge of the rod handle. When the reel rotates so as to bring one of its lobes against the slide 60 so as to lift the slide, the upper end of the slide assumes the position shown in phantom lines in FIG. 3 wherein it is above the end of the rod handle and the mast end is freed allowing the flag 56 to spring into the position shown in phantom lines in FIG. 2.

When the support 46 is aligned coaxially with the rod handle in the manner illustrated in FIG. 6 and the resilient ring 52 is brought up over the handle section containing the support 46, the rod may be used for hand held fishing either through the ice or otherwise. It may also be used for "jigging" which involves suddenly lifting the tip of the rod and allowing the bait to slowly sink down.

To set-up the rod for ice fishing the ring 52 is moved downwardly on the handle until it clears the support section 46 and then the support is pivoted outwardly so that it extends normally to the handle in the manner illustrated in FIG. 1. The rod may then be supported over a hole 64 formed in ice 66 so that the line guide section 14 of the rod, and the reel 24 extend downwardly into the body of water below the ice. To minimize the size of hole 64 needed to be formed in the ice in order to accomodate the reel the reel handle is pushed to the inward position.

The resilient ring 52 may be moved against the reel, in the position shown in FIG. 1, in order to brake the reel or the reel may be allowed to spin freely, depending upon the type of fishing that the rod is being used for.

The tip-up is engaged by bringing the free end of the mast 54 into the slot 58 while the slide 60 is resting on a low point of the cam 62. Any rotation of the reel 24 will then raise the slide 60 freeing the end of the tip-up and signalling the fisherman.

The embodiments of the invention in which an exclusive property or privilege is claimed are defined as follows:

1. An elongated ice fishing rod having a handle section at one end which is channel shaped in cross-section; a line guide section at the opposite end; a reel retaining section between the handle section and the line guide section; and an elongated support section having its midpoint pivotably supported to the free end of the handle section so that it may be disposed in a first position wherein it partially lies within said channel section and forms a coaxial extension of said handle or a second position wherein it projects normally relative to said handle section and is adapted to lie across a hole formed in ice so that the line guide section, the reel retaining section and the handle section project downwardly through the hole.

2. The fishing rod of claim 1 including a reel rotatably supported within said reel retaining section about an axle extending normally to the axis of the rod.

3. The fishing rod of claim 2 including a resilient band supported on and surrounding said handle section and adapted to be moved along the handle section between one position wherein it retains the support section within the channel shaped handle section so that the support section extends coaxially to said handle section, and a second position wherein it bears against said reel so as to act as a brake on said reel.

4. The rod of claim 3 including a crank member adjustably supported on the axle of the reel so that its extension from the axle may be varied.

5. The rod of claim 2 including a resilient tip-up mast having one end fixed to the rod end adjacent to its point of connection to the support section; a flag supported on said mast; and means for retaining the free end of the mast adjacent to the rod handle in a non-alarm position in such a manner that movement of the reel frees the mast end and allows the flag to move to an alarm position.

6. The rod of claim 5 wherein the means for retaining the free end of the mast so that the tip-up flag is in a non-alarm position includes a cam fixed to the reel and a slide supported within said rod handle for longitudinal movement relative to the rod handle and having one end adapted to bear against said cam, and means on the opposite end of the slide for controllably retaining the free end of the resilient tip-up mast.

7. The rod of claim 6 wherein the end of the slide opposite the end which bears against the cam projects from the far end of the rod handle and said means on the opposite end includes an aperture formed therein for retaining the free end of the tip-up mast.

8. A fishing rod consisting of an elongated U-shaped channel section having a portion of the channel web cut away along the central section of the rod; a reel journaled between the two flanges of the channel section adjacent said cutaway web section; and an elongated support section pivotably connected at a point between its ends to an end of said rod channel whereby said support section may be moved into a first position wherein part of its section is disposed within the rod channel and the balance projects axially from the end of the rod channel, and a second position wherein it extends normally to the rod channel and acts as a support for retaining the rod in an ice hole.

* * * * *